July 1, 1958 L. A. EVANS 2,841,441
CONVERTIBLE MOTOR VEHICLE BODY HAVING A RIGID TOP
Filed April 13, 1956 5 Sheets-Sheet 2
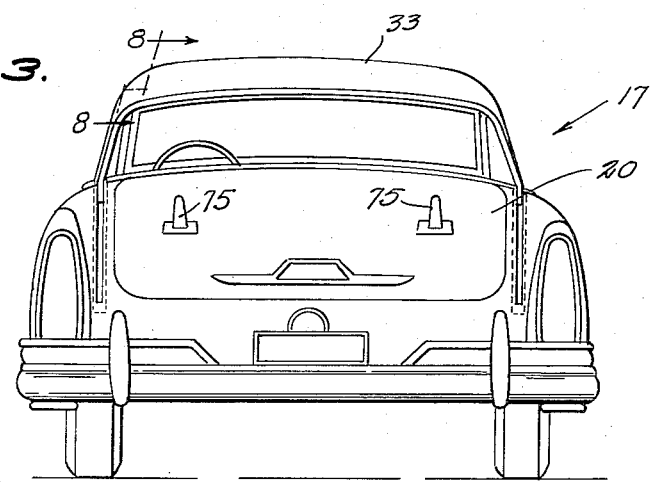
FIG. 3.
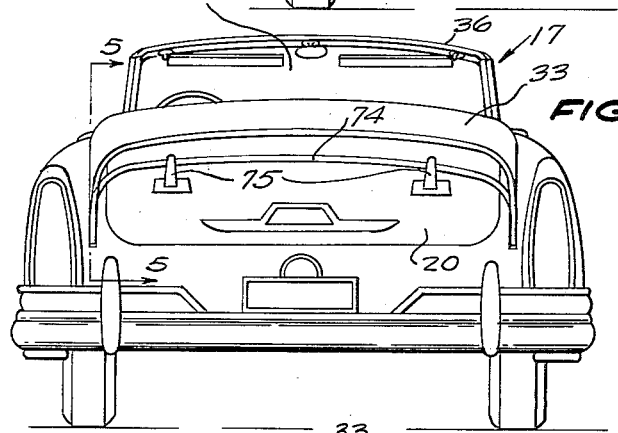
FIG. 4.
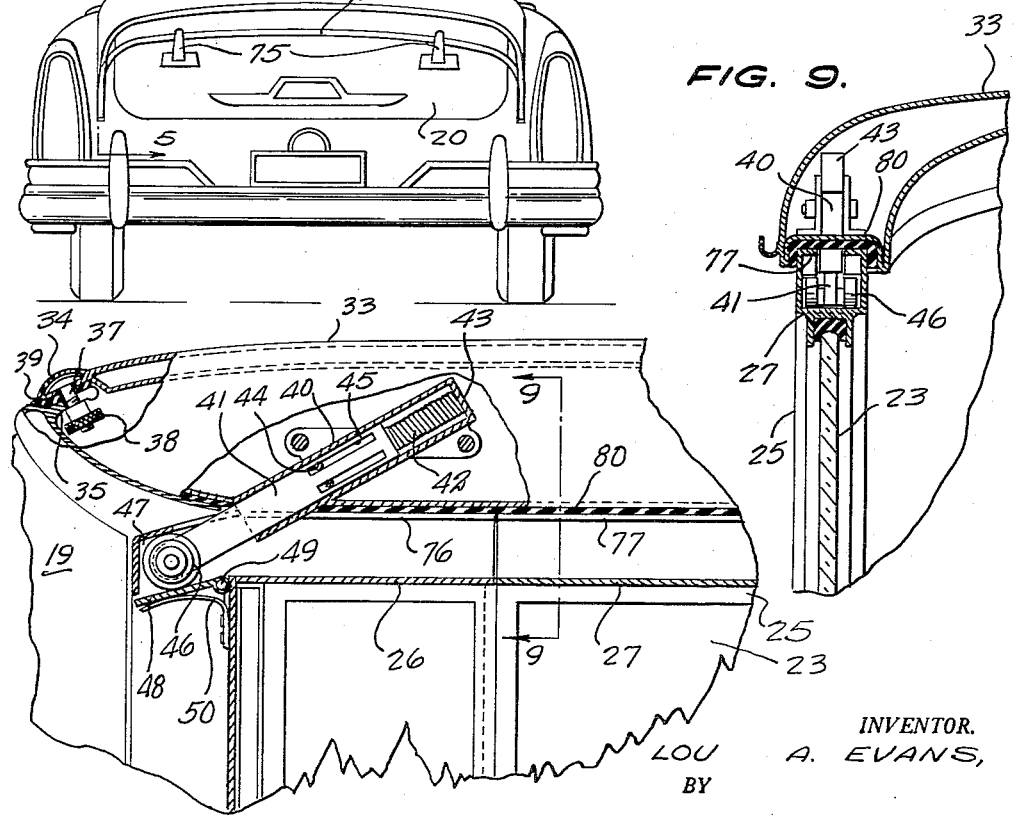
FIG. 9.
FIG. 8.
INVENTOR.
LOU A. EVANS,
BY McMorrow, Berman + Davidson
ATTORNEYS.

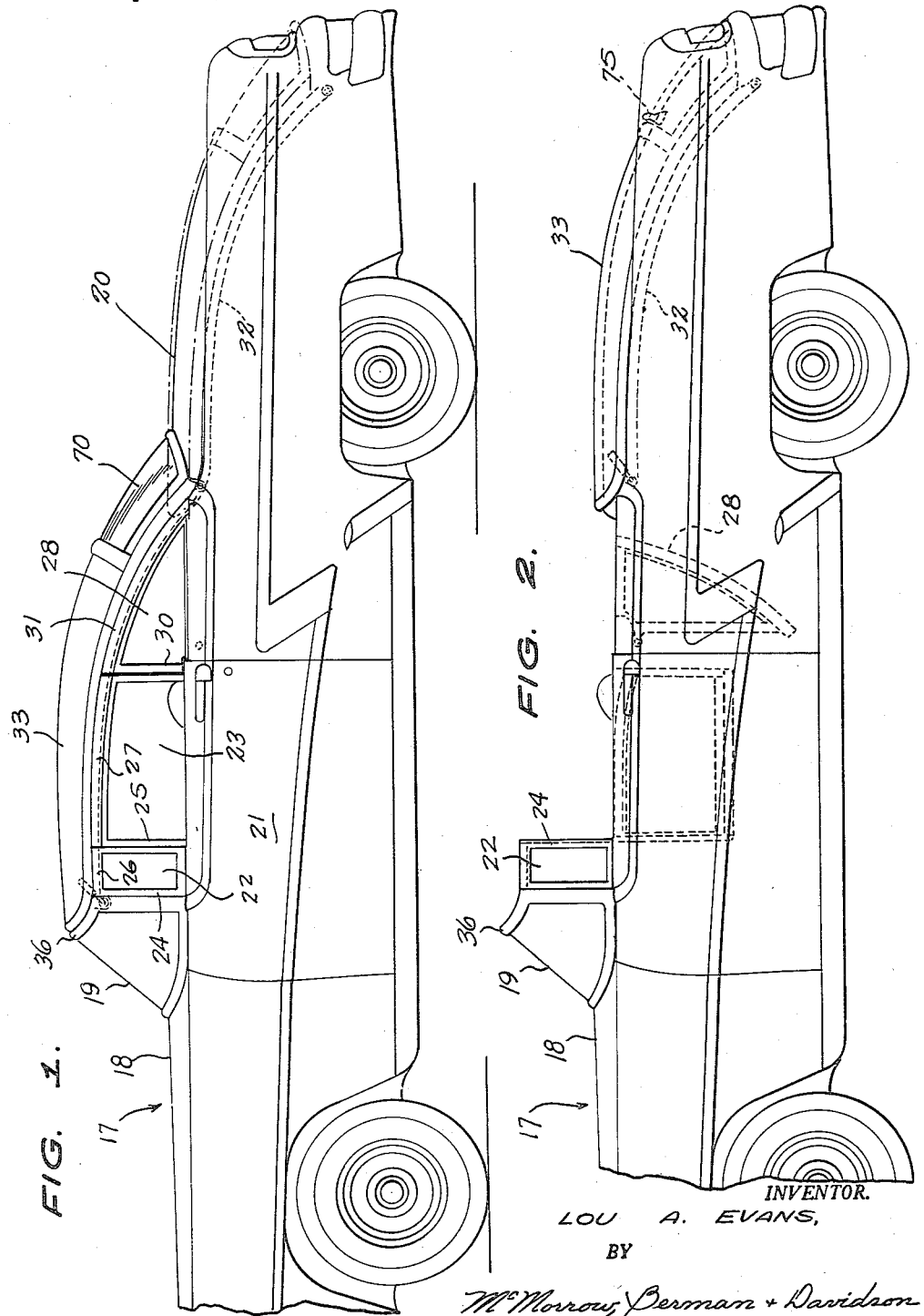

July 1, 1958
L. A. EVANS
2,841,441
CONVERTIBLE MOTOR VEHICLE BODY HAVING A RIGID TOP
Filed April 13, 1956
5 Sheets-Sheet 3
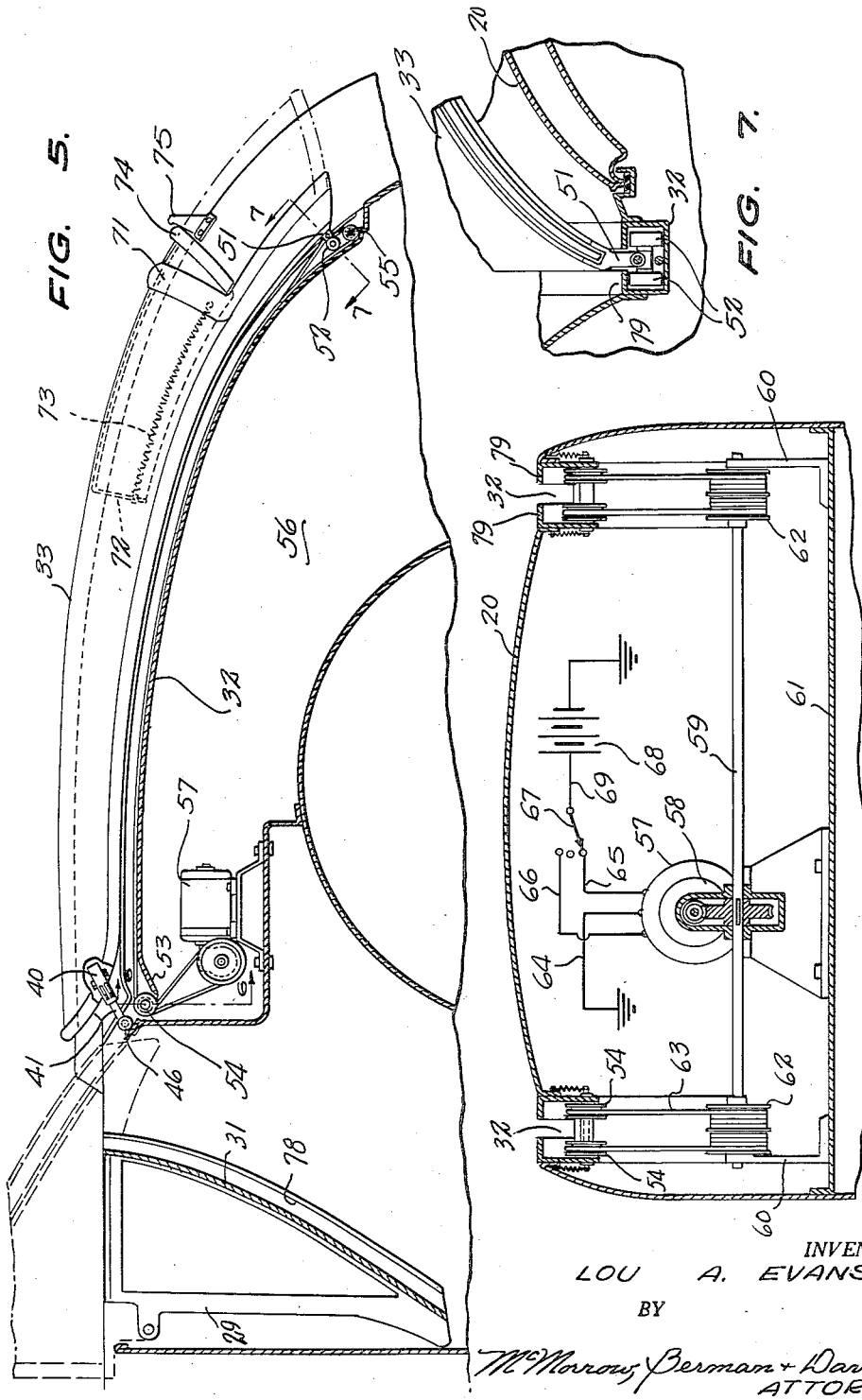
INVENTOR.
LOU A. EVANS,
BY
McMorrow, Berman + Davidson
ATTORNEYS.

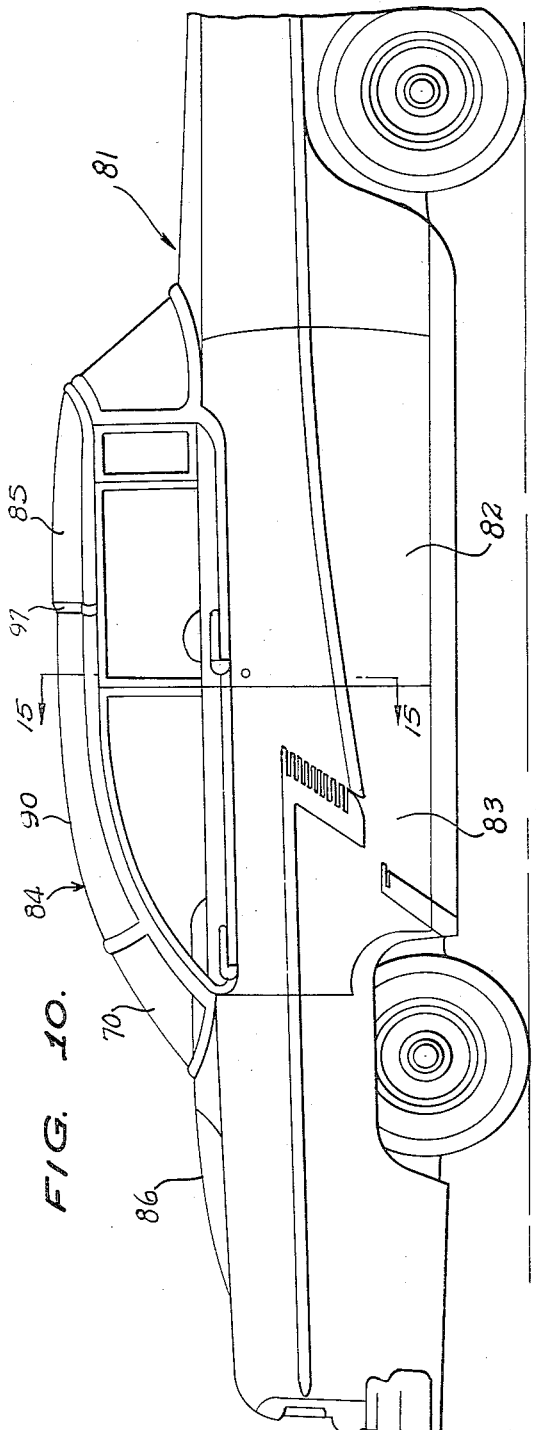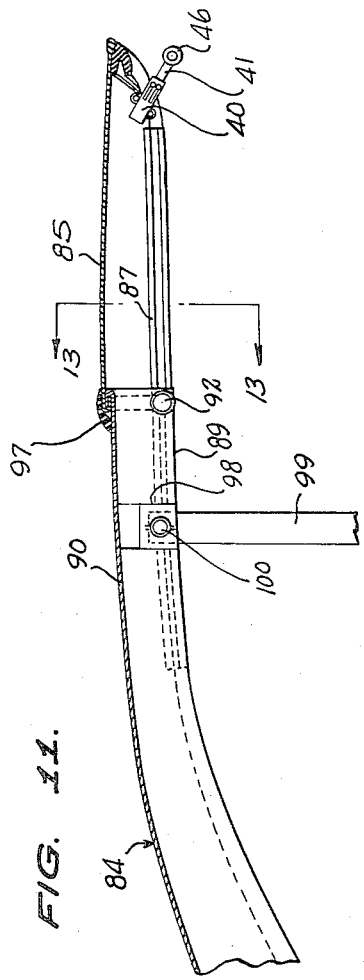

July 1, 1958  L. A. EVANS  2,841,441
CONVERTIBLE MOTOR VEHICLE BODY HAVING A RIGID TOP
Filed April 13, 1956  5 Sheets-Sheet 5
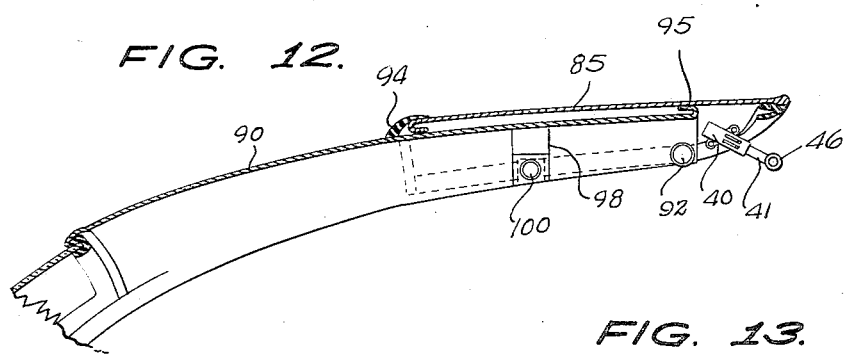
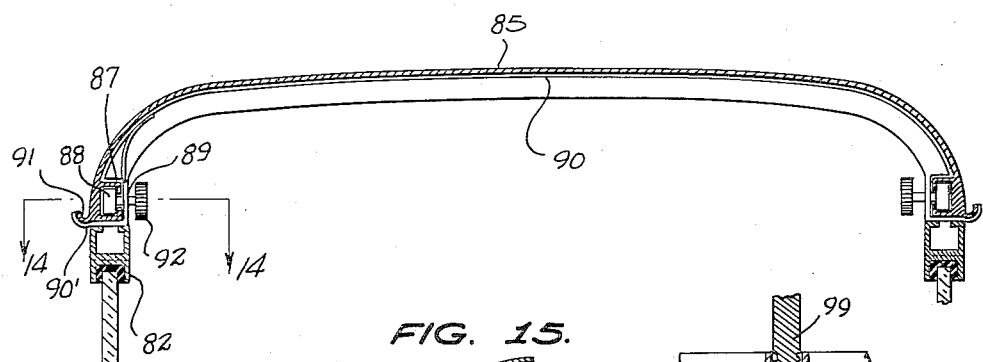
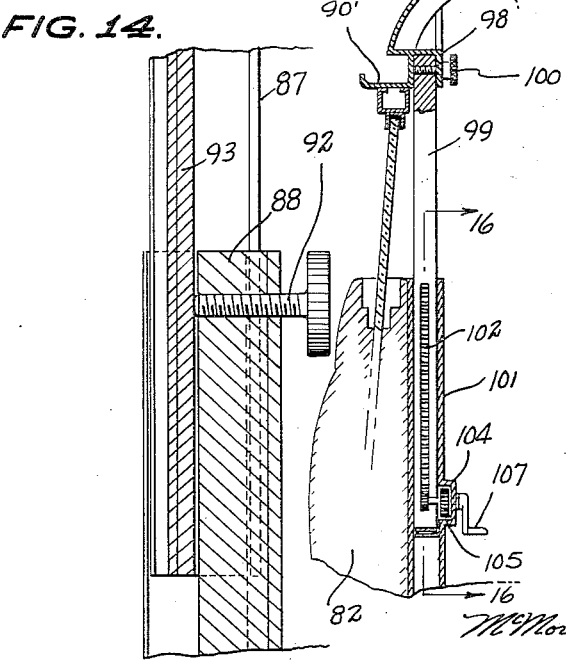
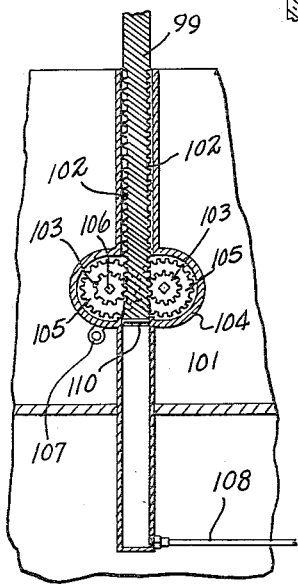
INVENTOR.
LOU A. EVANS,
BY
McMorrow, Berman & Davidson
ATTORNEYS.

United States Patent Office 2,841,441
Patented July 1, 1958

2,841,441

CONVERTIBLE MOTOR VEHICLE BODY HAVING A RIGID TOP

Lou A. Evans, Atlanta, Ga.

Application April 13, 1956, Serial No. 577,974

9 Claims. (Cl. 296—117)

This invention relates to motor vehicle bodies, and more particularly to vehicle bodies of the convertible type.

A main object of the invention is to provide a novel and improved motor vehicle body of the convertible type having a rigid top which may be readily opened, when desired, and which is movable into an inconspicuous, out-of-the-way position when its use is not required.

A further object of the invention is to provide an improved motor vehicle body of the convertible type and which is provided with means for readily opening and closing its top, the body being simple in construction, being provided with reliable means for opening and closing the top, and being arranged so that the top may be readily moved to an out-of-the-way, inconspicuous position without detracting from the appearance of the body.

A still further object of the invention is to provide an improved motor vehicle body of the type having a rigid top and which is convertible so that the top may be either opened or closed, as desired, the body involving inexpensive parts, being durable in construction, being attractive in appearance, and being arranged so that the means for opening and closing the top does not substantially interfere with the appearance or function of the body.

Further objects and advantages of the invention will become apparent from the following description and claims, and from the accompanying drawings, wherein:

Figure 1 is a side elevational view of the major portion of a motor vehicle having a body constructed in accordance with the present invention and being provided with a rigid top, shown in closed position.

Figure 2 is a side elevational view of the vehicle of Figure 1 with the rigid top in open position.

Figure 3 is a rear elevational view of the vehicle of Figure 1.

Figure 4 is a rear elevational view of the vehicle with the top in its open position, as in Figure 2.

Figure 5 is an enlarged vertical cross sectional view taken on the line 5—5 of Figure 4.

Figure 6 is an enlarged transverse vertical cross sectional view taken on the line 6—6 of Figure 5.

Figure 7 is an enlarged transverse vertical cross sectional detail view taken on the line 7—7 of Figure 5.

Figure 8 is an enlarged cross sectional detail view taken substantially on the line 8—8 of Figure 3.

Figure 9 is a transverse vertical cross sectional view taken on the line 9—9 of Figure 8.

Figure 10 is a fragmentary side elevational view of a modified form of motor vehicle body according to the present invention, the vehicle being of the four-door type and being provided with a convertible rigid top with disappearing side posts, in accordance with this invention.

Figure 11 is an enlarged longitudinal vertical cross sectional view taken through the convertible top of the vehicle body of Figure 10.

Figure 12 is a fragmentary longitudinal vertical cross sectional view, similar to Figure 11, but showing the forward portion of the rigid top in a rearwardly adjusted position.

Figure 13 is a transverse vertical cross sectional view taken on the line 13—13 of Figure 11.

Figure 14 is an enlarged horizontal cross sectional detail view taken on the line 14—14 of Figure 13.

Figure 15 is an enlarged fragmentary transverse vertical cross sectional view taken on the line 15—15 of Figure 10.

Figure 16 is an enlarged cross sectional detail view taken on the line 16—16 of Figure 15.

Referring to the drawings, and more particularly to Figures 1 through 9, 17 generally designates a motor vehicle having a convertible body according to the present invention, the motor vehicle being of the two-door type, as shown. Thus, the body, shown at 18, is provided with a conventional windshield 19 at its forward portion and is provided at its rear portion with the conventional trunk deck 20. The body is further provided with the respective opposite side doors 21 having the respective window elements 22 and 23. The window elements 22 are of the vertically pivoted type, and are mounted in frames 24 rigid with the doors 21 which are arranged in coplanar relationship with the windows 23 and the vertically movable frames 25 of said windows 23.

Thus, the frame 24 has a channeled top portion 26 which may be aligned with a similar channeled top portion 27 provided on the window frame 25 when window frame 25 is in its raised position.

The vehicle body 18 is provided with the pivoted rear window members 28, said rear window members being pivoted to the side walls of the body at their lower forward corners, and being swingable into the wall from the normally closed positions thereof, as shown in Figure 1, to the fully opened positions thereof, as shown in dotted view in Figure 2. The rear windows 28 are provided with frames 30 having channeled top portions 31 which may be aligned with the top portions 27 of the respective window frames 25 when the rear windows 28 are in their fully elevated positions and when the windows 23 are in their fully closed positions, as shown in Figure 1. The channeled portions 31 are sloped downwardly and rearwardly toward the respective sides of the trunk deck 20. Respective longitudinal channels or tracks 32, 32 are provided at the opposite sides of the trunk deck 20, said tracks 32, 32 being curved so as to generally follow the longitudinal curvature of said trunk deck, as shown in Figures 1 and 2.

Designated at 33 is the convertible top, said top being of suitable rigid material, such as sheet metal or the like, and being formed to engage at its forward portion on the top edges of the windshield, the window frames 24, 25 and 30 and to engage at its rear portion on the forward marginal portion of the trunk deck 20. Thus, as shown in Figure 8, the rigid top 33 has a forward marginal flange 34 which is engageable on a plurality of rearwardly extending, notched lugs 35 provided at spaced points along the top portion of the windshield frame 36 and being adapted to receive respective fastening bolts 37 mounted in the flange 34 and being receivable in the notched lugs 35. The bolts 37 are provided with thumb nuts 38 which may be tightened to secure the flange 34 against a sealing gasket 39 interposed between the top portion 36 of the windshield frame and the flange 34, as shown in Figure 8, to provide a liquid tight seal between flange 34 and the top of the windshield frame.

Mounted in the forward corner portions of the rigid top 33 are respective downwardly and forwardly inclined housing members 40 of rectangular transverse cross section and generally sleeve-like construction, said housings 40 slidably receiving respective arms 41 which are biased downwardly and forwardly by coiled springs 42 provided in the rear portions of the housings 40 and bearing between the ends of the arms 41 and the rear walls 43 of said housings. Transverse retaining pins 44 in the housings extend through longitudinal slots 45 in the arms 41, limiting the downward and forward extension of the arms. Journaled to the lower ends of the arms are rollers 46 which are receivable in the aligned channel elements 26, 27, and 31, and which normally, namely, when the top is in its closed position, are received in respective terminal sockets 47 provided in the top portions of the side posts of the windshield 19, as shown in Figure 8. Said sockets 47 have pivoted bottom walls 48 which are hinged to the rear walls of the windshield side posts at 49 and which are resiliently supported by leaf springs 50 provided in the hollow side posts of the windshield frame beneath the bottom walls 48, as is clearly illustrated in Figure 8.

Rigidly secured to and depending from the rear corner portions of the top 33 are respective lugs 51 to the lower ends of which are journaled respective rollers 52 which are engaged in the channel tracks 32 and which are normally received in the downwardly and forwardly inclined forward end portions 53 of said channel tracks 32 when the top is in its closed position, shown in Figure 1. Journaled in each channeled track 32, forwardly adjacent the terminal portion 53 thereof are the pulleys 54, 54 and journaled in the rear portion of each track 32 rearwardly adjacent the terminal postion of the associated lug 51 when the top is in its rearwardly adjusted position is a pulley 55.

Mounted in the forward portion of the trunk compartment, designated at 56, is a suitable electric motor 57 which is drivingly coupled to suitable worm gearing, shown at 58, to a transverse shaft 59 journaled at its ends in suitable transversely aligned bearing brackets 60, 60 mounted on the wall portion 61 of the trunk, as shown in Figure 6. Respective double reels 62, 62 are secured on the respective end portions of the shaft 59, and connected at its end portions to the respective reel sections of each double reel 62 is a flexible cable 63 which extends over the respective pulleys 54 adjacent thereto, as shown in Figure 6, and which extends along the bottom portion of the associated guide channel 32 and around the pulley 55 at the rear end of said guide channel. The cable 63 is secured to the depending lug 51 associated with the guide channel 32, as shown in Figures 5 and 7, whereby the intermediate portion of the cable is connected to a lug 51, and whereby the respective cables are thus connected to the rear corner portions of the top 33.

Motor 57 is of the reversible type, and, for example, may comprise two windings having a common terminal 64 which is connected to the vehicle body ground, as shown in Figure 6, and having respective energizing terminals 65 and 66 which may be selectively energized, as by a multiple position selector switch 67 mounted on the vehicle dashboard and having a movable contact arm connected to the ungrounded terminal of the vehicle battery 68, as by a wire 69 shown in the wiring diagram of Figure 6. When one of the windings of the motor 57 is energized, the motor is operated in one direction, and when the other winding is energized, the motor is operated in the opposite direction, whereby the movable top 33 may be either moved forwardly from the position thereof shown in Figure 2 to the closed position shown in Figure 1, or may be moved rearwardly from the position of Figure 1 to the retracted position of Figure 2.

The rigid top 33 is provided with a slidable rear window 70 which is slidably supported in a suitable window frame 71 and which is provided at its forward end with a depending flange element 72. The flange element 72 is connected by suitable spring means, such as coiled springs 73 to the respective side portions of the forward elements of the rear window frame 71, as shown in Figure 5, whereby the window 70 is biased rearwardly towards a closed position. Window 70 has a marginal frame element 74 which is engageable with upstanding bracket members 75 on the deck 20 when the top 33 is retracted to the position thereof shown in Figure 2, whereby window frame element 74 cooperates with the brackets 75 to provide a cushioning stop means for limiting the rearward movement of the rigid top 33 so as to prevent damage to the top, or to said rear window 70 when the top is retracted from the position of Figure 1 to the position of Figure 2 by operating the motor 57. Similarly, when the top is moved to its closed position from the open position of Figure 2, the spring means 73 serves to facilitate the starting of the forward movement of the top 33 and tends to assist the motor 57 in moving the top forwardly.

Suitable limit switches may be provided at the extreme ends of the open and closed positions of the top 33, said switches being connected in the respective motor circuits and being arranged to open automatically when the top reaches either its fully opened or fully closed position to deenergize the associated motor winding. As is well understood said switches would be normally closed and would be engaged by the top to open same when the top reaches its limiting poistions. Similar switches may be provided in the motor circuits to prevent energization of the motor unless all the window tracks 27 and 31 are in their fully raised positions. These switches may be of the normally open type and may be mounted on the window frames to engage the adjacent portions of the vehicle body and close responsive to the movement of the window frames to their fully raised positions.

As will be readily apparent from Figures 8, 9 and 7, the guide track elements 26, 27, 31 and 32 are provided with inturned top flanges, such as shown at 76, 77, 78 and 79 which serve as retaining means for the respective pairs of rollers 46 carried by the arms 41 and 52 carried by the lugs 51.

As will be readily apparent, the arms 41 are yieldable in their guide housings 40, so that the top may be moved in a smooth and efficient manner and whereby the arms 41 will accommodate irregularities in the curvature of the guide tracks, while the top 33 will move smoothly from its forward position to its rear position or vice versa.

As will be readily apparent, in order to retract the top 33, it is merely necessary to loosen the clamping nuts 38 and to then energize the motor 57 to retract the top 33, whereupon the top 33 will be retracted and will be moved to the position thereof shown in Figure 2 wherein the top overlies the trunk deck 20. As the top reaches its final position, its movement is cushioned by the springs 73, whereby the final portion of the rearward movement of the top 33 is sufficiently cushioned to prevent damage to the top or to the rear window 70, and whereby the rearmost movement of the top is slowed down to enable the operator to deenergize the motor 57 before said motor can be damaged.

The top 33 may be restored to its closed position, shown in Figure 1, by energizing the reverse winding of motor 57 to move the top forwardly from the position of Figure 2.

As shown in Figure 8, suitable sealing strips 80 of resilient deformable material are provided beneath the edges of the top 33 to sealingly engage with the inturned top flanges of the guide track elements to form a moisture tight seal between the top and the side portions of the body when the top is in its closed position.

Referring now to Figures 10 to 16, 81 generally designates a motor vehicle of the four-door type, having the forward doors 82 and the rear doors 83 and provided with a retractable top, shown generally at 84 similar to the top previously described and illustrated in Figures 1 to 9, except that the top 84 is provided with a retractable forward section 85 so that the top may be shortened to allow it to be retracted into its rear position overlying the trunk deck, shown at 86. The forward portion 85 is provided with longitudinally slotted guide means 87, comprising longitudinal channels mounted on the inside surfaces of its side margins and slidably receiving T-shaped block elements 88 rigidly connected to the depending marginal flange portions 89 of the main section 90 of the top. As shown in Figure 13, the flanges 89 have outwardly extending horizontal portions 90' which underlie the drain channel portions 91 of the forward section 85 and telescopically engage therewith. A clamping screw 92 is threadedly engaged through the stem portion of each block 88 and is clampingly engageable with the inside wall 93 of the associated guide member 87, as shown in Figure 14, whereby the section 85 may be locked in an adjusted position with respect to the rear section 90 by tightening the clamping screws 92. Thus, when the top is in its fully closed position, shown in Figures 10 and 11, the forward section 85 is extended to its forward limiting position, which is determined by the interlocking engagement of a transversely extending locking flange 94, facing forwardly, on the rear margin of section 85 and a rearwardly facing transverse locking flange 95 on the forward margin of section 90.

As shown in Figure 12, the transversely channeled flange element 94 slidably overlies the rear section 90, whereas the transversely extending channeled element 95 transversely underlies the forward section 85, being slidably engageable therewith. When the forward section 85 is moved forwardly, the flanges 94 and 95 interlock, in the manner illustrated in Figure 11, to limit further forward movement of section 85 with respect to section 90. The forward section 85 may be locked in its extended position by tightening the clamping screws 92, as above described. Similarly, the section 85 may be locked in its retracted position by tightening the same screws after moving the section 85 rearwardly to the position thereof shown in Figure 12.

A suitable sealing strip 97 of resilient deformable material is secured on the rear margin of the section 85 and sealingly engages the top surface of the rear section 90, providing a sealed joint between the sections.

As is obvious from Figure 11, the forward section 85 is provided with the downwardly and forwardly extending housings 40 supporting the arms 41 on which the forward guide rollers 46 are journaled.

The main section 90 of the top 84 is provided on the inside portions of its side walls with respective, generally rectangular socket elements 98 adapted to receive the top ends of respective vertically movable post elements 99, said socket elements 98 being provided with fastening screws 100 which are threadedly engageable through apertures in the front walls of the socket elements with the top portions of the post elements 99 to fasten said post elements after they have been elevated to the positions thereof shown, for example, in Figure 15. The post elements 99 are slidably mounted in respective vertical sleeves 101 provided in the vehicle body and defining the door posts between the doors 82 and 83. As shown in Figure 16, the vertically movable post elements 99 are provided on their opposite edges with rack gear teeth 102 which are meshingly engaged by respective rack gears 103, 103 journaled in a gear housing 104 secured to the intermediate portion of the hollow door post 101. The gears 103, 103 are provided with shafts on which are rigidly mounted meshing gears 105, 105, one of said shafts 106 being provided at its inner end with a crank handle 107, whereby the post element 99 may be raised or lowered by rotating the crank handle 107. Figure 16 illustrates an alternative means of raising or lowering the post member 99, comprising a hydraulic fluid line 108 connected to the lower end of the hollow door post 101, whereby said door post serves as a hydraulic cylinder with respect to the movable post element 99, said post element 99 being provided at its bottom end with a resilient deformable sealing cup element 110 sealingly and slidably engaging the inside surface of the hollow door post 101. By introducing hydraulic fluid under pressure to the lower end of the hollow door post 101, the associated post element 99 may be elevated. By allowing the fluid to discharge from the hollow door post 101, for example into a suitable fluid reservoir, the post elements 99 may be allowed to descend by gravity to their retracted positions in the door posts 101.

From the above description, it will be readily apparent that the vehicle body of Figures 10 to 16 may be converted to an open condition by first retracting the forward section 85 of the top 84 in the manner above described, and by then retracting the top 84 to a position overlying the contact 86 by means of the motor 57, as in the previously described form of the invention. The post elements 99 may then be lowered, either by the use of the cranks 107, or by the hydraulic fluid means above described, whereby the conversion is complete.

To return the vehicle to its fully closed condition, such as is shown in Figure 10, the above procedure is reversed.

It will be understood that the locking screws 100 must be withdrawn before the top 84 is retracted, and that the post 99 must be lowered sufficiently to disengage the top ends of said posts from the sockets 98.

While certain specific embodiments of an improved motor vehicle body of the convertible type have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a body including a windshield at the forward portion thereof, a trunk deck at the rear portion thereof, opposite side wall elements and doors in the opposite side wall elements, a rigid top engageable on the top edges of said windshield, side wall elements and said doors and having a rear portion engageable on the forward marginal portion of said trunk deck, respective guide tracks on the top marginal portions of said doors and side wall elements, track means formed on the opposite side portions of said trunk deck, depending, resilient guide follower elements secured to the opposite side edges of said top at its forward portion and engaged with said guide tracks, additional guide follower elements secured to the side edges of said top at its rear portion and engaging said track means, said additional guide follower elements being engageable in said track means when the top is moved rearwardly, whereby said top may be at times moved into a position overlying said trunk deck, a socket in the forward end of each guide track formed and arranged to receive an associated guide follower element, each socket having a pivoted bottom wall, and resilient means supporting said bottom wall and exerting upward force on the pivoted bottom wall.

2. In a motor vehicle, a body including a windshield at the forward portion thereof, a trunk deck at the rear portion thereof, opposite side wall elements, and doors in the opposite side wall elements, a rigid top engageable on the top edges of said windshield, side wall elements and said doors and having a rear portion engageable on the forward marginal portion of said trunk deck, respective guide tracks on the top marginal portions of said doors and side wall elements, track means formed on the opposite side portions of said trunk deck, depending, resilient guide follower elements secured to the opposite side edges of said top at its forward portion and engaged with said guide tracks, additional guide follower elements secured to the side edges of said top at its rear portion and engaging said track means, said additional guide follower elements being engageable in said track means when the top is moved rearwardly, whereby said top may be at times moved into a position overlying said trunk deck, a socket in the forward end of each guide track formed and arranged to receive an associated guide follower element, each socket having a pivoted bottom wall, and resilient means supporting and exerting upward force on the pivoted bottom wall, and upstanding stop means on said trunk deck engageable with the top to limit rearward movement thereof.

3. In a motor vehicle, a body including a windshield at the forward portion thereof, a trunk deck at the rear portion thereof, opposite side wall elements, and doors in the opposite side wall elements, a rigid top engageable on the top edges of said windshield, side wall elements and said doors and having a rear portion engageable on the forward marginal portion of said trunk deck, respective guide tracks on the top marginal portions of said doors and side wall elements, track means formed on the opposite side portions of said trunk deck, depending, resilient guide follower elements secured to the opposite side edges of said top at its forward portion and engaged with said guide tracks, additional guide follower elements secured to the side edges of said top at its rear portion and engaging said track means, said additional guide follower elements being engageable in said track means when the top is moved rearwardly, whereby said top may be at times moved into a position overlying said trunk deck, a socket in the forward end of each guide track formed and arranged to receive an associated guide follower element, each socket having a pivoted bottom wall, and resilient means supporting and exerting upward force on the pivoted bottom wall, a reversible motor mounted in the rear portion of said body, a transverse shaft drivingly coupled to said motor, pulley means on the opposite end portions of said shafts, and respective cables secured to the rear side portions of said top and drivingly engaged with said pulley means to move said top forwardly or rearwardly responsive to forward or reverse energization of said motor.

4. In a motor vehicle, a body including a windshield at the forward portion thereof, a trunk deck at the rear portion thereof, opposite side wall elements, and doors in the opposite side wall elements, a rigid top engageable on the top edges of said windshield and said doors and having a rear portion engageable on the forward marginal portion of said trunk deck, respective guide tracks on the top marginal portions of said doors, track means formed on the opposite side portions of said trunk deck, respective downwardly and forwardly extending resilient follower elements mounted on the opposite forward side portions of said top and engaged in said guide tracks, additional follower elements mounted on the opposite rear side portions of said top and engaged in said track means, a socket in the forward end of each guide track formed and arranged to receive an associated resilient guide follower element, and a yieldable bottom wall in each socket.

5. In a motor vehicle, a body including a windshield at the forward portion thereof, a trunk deck at the rear portion thereof and doors in the opposite side wall elements thereof, a rigid top engageable on the top edges of said windshield and said doors and having a rear portion engageable on the forward marginal portion of said trunk deck, respective guide tracks on the top marginal portions of said doors, track means formed on the opposite side portions of said trunk deck, respective downwardly and forwardly extending resilient follower elements mounted on the opposite forward side portions of said top and engaged in said guide tracks, a socket in the forward end of each guide track formed and arranged to receive an associated resilient guide follower element, a yieldable bottom wall in each socket, additional follower elements mounted on the opposite rear side portions of said top and engaged in said track means, upstanding stop means on the intermediate portion of said trunk deck engageable with the top to limit rearward movement thereof, a reversible motor mounted in the rear portion of said body, a transverse shaft drivingly coupled to said motor, pulley means on the opposite end portions of said shaft, and respective cables secured to the rear side portions of said top and drivingly engaged with said pulley means to move said top forwardly or rearwardly responsive to forward or reverse energization of said motor.

6. In a motor vehicle, a body including a windshield at the forward portion thereof, a trunk deck at the rear portion thereof and doors in the opposite side wall elements thereof, a rigid top engageable on the top edges of said windshield and said doors, said top comprising a rear portion engageable on the forward marginal portion of said trunk deck, a forward portion slidably connected to said rear portion, and means for at times fixedly securing said forward portion to said rear portion, respective guide tracks on the top marginal portions of said doors, track means formed on the opposite side portions of said trunk deck, and depending, resilient guide follower elements secured to the opposite side edges of said top and engaged with said guide tracks, additional guide follower elements secured to the side edges of said top at its rear portion and engaging said track means, said additional guide follower elements being engageable in said track means when the top is moved rearwardly, whereby said top may be at times moved into a position overlying said trunk deck, a socket in the forward end of each guide track formed and arranged to receive an associated depending resilient guide follower element, and a yieldable bottom wall in each socket.

7. In a motor vehicle, a body including a windshield at the forward portion thereof, a trunk deck at the rear portion thereof and doors in the opposite side wall elements thereof, a rigid top engageable on the top edges of said windshield and said doors and having a rear portion engageable on the forward marginal portion of said trunk deck, respective guide tracks on the top marginal portions of said doors, track means formed on the opposite side portions of said trunk deck, depending, resilient guide follower elements secured to the opposite side edges of said top and engaged with said guide tracks, additional guide follower elements secured to the side edges of said top at its rear portion and engaging said track means, said additional guide follower elements being engageable in said track means when the top is moved rearwardly, whereby said top may be at times moved into a position overlying said trunk deck, a socket in the forward end of each guide track formed and arranged to receive an associated depending resilient guide follower element, a yieldable bottom wall in each socket, upstanding sleeve elements at the intermediate portions of the side walls of said body, respective post elements slidably mounted in said sleeve elements, and means for detachably securing the top ends of the post elements to the side marginal portions of said top.

8. In a motor vehicle, a body including a windshield at the forward portion thereof, a trunk deck at the rear portion thereof and doors in the opposite side wall elements thereof, a rigid top engageable on the top edges of said windshield and said doors, said top comprising a rear portion engageable on the forward marginal portion of said trunk deck, a forward portion slidably connected to said rear portion, and means for at times fixedly securing said forward portion to said rear portion, respective guide tracks on the top marginal portions of said doors, track means formed on the opposite side portions of said trunk deck, respective downwardly and forwardly extending resilient follower elements mounted on the opposite forward side margins of said forward portions and engaged in said guide tracks, additional follower elements mounted on the opposite rear side margins of said rear portions and engaged in said track means, said additional follower elements being engageable in said track means when the top is moved rearwardly, whereby said top may be at times moved into a position overlying said trunk deck, a socket in the forward end of each guide track formed and arranged to receive an associated resilient guide follower element, and a yieldable bottom wall in each socket.

9. In a motor vehicle, a body including a windshield at the forward portion thereof, a trunk deck at the rear portion thereof and doors in the opposite side wall elements thereof, a rigid top engageable on the top edges of said windshield and said doors and having a rear portion engageable on the forward marginal portion of said trunk deck, respective guide tracks on the top marginal portions of said doors, track means formed on the opposite side portions of said trunk deck, depending, resilient guide follower elements secured to the opposite side edges of said top and engaged with said guide tracks, additional guide follower elements secured to the side edges of said top at its rear portion and engaging said track means, said additional guide follower elements being engageable in said track means when the top is moved rearwardly, whereby said top may be at times moved into a position overlying said trunk deck, a socket in the forward end of each guide track formed and arranged to receive an associated depending resilient guide follower element, a yieldable bottom wall in each socket, a rear window slidably mounted in the rear end portion of said top, spring means biasing said rear window rearwardly, and upstanding stop means on said trunk deck engageable with the rear edge of the rear window to resiliently limit rearward movement of said top when the top is moved into said deck-overlying position.

References Cited in the file of this patent

UNITED STATES PATENTS

| | | |
|---|---|---|
| 1,899,832 | Steinecke | Feb. 28, 1933 |
| 2,105,293 | Paulin | Jan. 11, 1938 |
| 2,193,607 | Votypka | Mar. 12, 1940 |
| 2,575,864 | Croucher | Nov. 20, 1951 |
| 2,694,598 | Ulrich | Nov. 16, 1954 |
| 2,762,648 | Huzzard | Sept. 11, 1956 |

FOREIGN PATENTS

| | | |
|---|---|---|
| 448,042 | Great Britain | May 29, 1936 |